United States Patent [19]

Ichikawa et al.

[11] Patent Number: 5,173,250
[45] Date of Patent: Dec. 22, 1992

[54] APPARATUS FOR DEMOLISHING BIOLOGICAL SHIELD WALL OF A NUCLEAR REACTOR AND A METHOD OF DEMOLISHING THE SAME

[75] Inventors: Makoto Ichikawa; Tetsuo Hasegawa, both of Tokyo, Japan

[73] Assignee: Shimizu Construction Co., Ltd., Tokyo, Japan

[21] Appl. No.: 710,185

[22] Filed: Jun. 4, 1991

[30] Foreign Application Priority Data

Jun. 7, 1990 [JP] Japan .................................. 2-150394

[51] Int. Cl.$^5$ ............................................. G21C 19/42
[52] U.S. Cl. .................................... 376/310; 376/308; 376/295
[58] Field of Search .................... 376/310, 308, 295; 219/69.12, 69.2; 30/66.3; 125/16.1

[56] References Cited

U.S. PATENT DOCUMENTS

| | | | |
|---|---|---|---|
| 4,568,814 | 2/1986 | Hamasaki et al. | 219/121 |
| 4,813,313 | 3/1989 | Ichikawa et al. | 82/128 |
| 4,950,034 | 8/1990 | Reid | 299/15 |
| 5,052,366 | 10/1991 | Matsukura | 125/16.01 |

*Primary Examiner*—Donald P. Walsh
*Assistant Examiner*—Meena Chelliah
*Attorney, Agent, or Firm*—Ladas & Parry

[57] ABSTRACT

The present invention presents a novel apparatus and a method of demolishing a biological shield wall of a nuclear reactor using a concrete cutter device working on a wire saw, said apparatus comprising a concrete cutter device consisting of a driving part for a wire saw and a concrete cutting part attached on the engaging receiver of the driving part, a core boring machine to be attached interchangeably on the receiver in the place of the cutting part and a carrier truck to carry the wire saw driving part of said cutter device, further the concrete cutting part having a pair of vertical rods supported on a table movable vertically and adjustable in a distance of the rods and, at the bottom end of the rods, supporting pulleys and guide rollers for disposing the wire saw are provided.

11 Claims, 3 Drawing Sheets

APPARATUS FOR DEMOLISHING BIOLOGICAL SHIELD WALL OF A NUCLEAR REACTOR AND A METHOD OF DEMOLISHING THE SAME

FIELD OF THE INVENTION

The present invention relates to an apparatus for demolishing a biological shield wall of a nuclear reactor after its life and a method of demolishing the same.

PRIOR ART

Conventionally, as a method of demolishing a biological shield wall of a nuclear reactor after its life, a method of mechanical cutting using a combined wall saw and a core boring machine, or a method of demolishing of fluid cutting dynamics using an abrasive water jet are proposed.

This cutting method, however, applies a cutter device with its tripod legs fixed on the inside surface of a bell-shaped biological shield wall of a nuclear reactor, and its travelling operations with along the progressing of the operation are very troublesome, and the wall being a heavy structure, the fixing device therefor with the supporting legs assembled become comparatively larger, and by the fact that the device suffers radioactive contamination during the demolishing operation, there results a problem that mass of radioactive matters to be disposed of as the wastes increases after the operation.

Then, in view of the above-mentioned current state, the present invention was made to eliminate the disadvantage of the prior art, and the object of which is to present a novel apparatus and a method of demolishing a biological shield wall of a nuclear rector without requiring a large scale for the apparatus even for the larger biological shield wall, and accordingly never resulting in the increasing of mass of active wastes, and with along the progressing of the cutting operation, easy movement and also improvement of the efficiency of the operation can be accomplished.

DISCLOSURE OF THE INVENTION

The feature of the present invention lies in that, in a demolishing apparatus for a biological shield wall of a nuclear reactor using a concrete cutter device working on a wire saw, said apparatus comprises a concrete cutter device consisting of a driving part for a wire saw and a concrete cutting part attached to the engaging receiver of the driving part, a core boring machine to be attached interchangeably on the engaging receiver in the place of the cutting part and a carrier truck to carry the wire saw driving part of said cutter device. Further, the concrete cutting part has a pair of vertical rods supported on a table movable vertically and adjustable in a distance from each other rods, and the table is pivoted to swing horizontally, and at the bottom end of the rods, supporting pulleys and guide rollers for arranging the wire saw are provided.

The other feature of the present invention lies in that, in a method of demolishing a biological shield wall of a nuclear reactor using the demolishing apparatus described above, a method comprising a step of setting the carrier truck on the operating floor of the reactor building, with a core boring machine attached on the reciever and with the carrier moving on, a step of boring holes downward from top of the shield wall at a predetermined distance, then with the concrete cutting part attached in the place of the boring machine, a step of inserting a pair of vertical rods in the bored hole through adjusting of the table to circurate the wire saw between the supporting pulleys, while with the carrier moved along and the vertical rods controlled and adjusted to enable the cutting of wire saw to cut a concrete block from the shield wall to dispose finally.

According to the present invention, by setting the carrier truck carrying the wire saw driving part attached by the wire saw cutting part on the operating floor of the reactor building, the biological shield wall is cut and demolished by the core boring machine and the wire saw cutting part, and then, with along the progressing of the cutting operation, easy movement and also improvement of the efficiency of the operation can be accomplished, without requiring a large scale for the apparatus even when the biological shield wall gets larger, and accordingly never resulting in the increasing of mass of active wastes.

The other features of the present invention are understood by the following non-limiting embodiments shown in the following drawings.

BRIEF DESCRIPTION OF THE DRAWINGS

From FIG. 1 through FIG. 10 illustrates embodiments of the present invention.

BEST MODE OF CARRYING OUT THE INVENTION

The present invention will be described in detail with reference to the attached drawings of a preferred embodiment.

Figure 1:
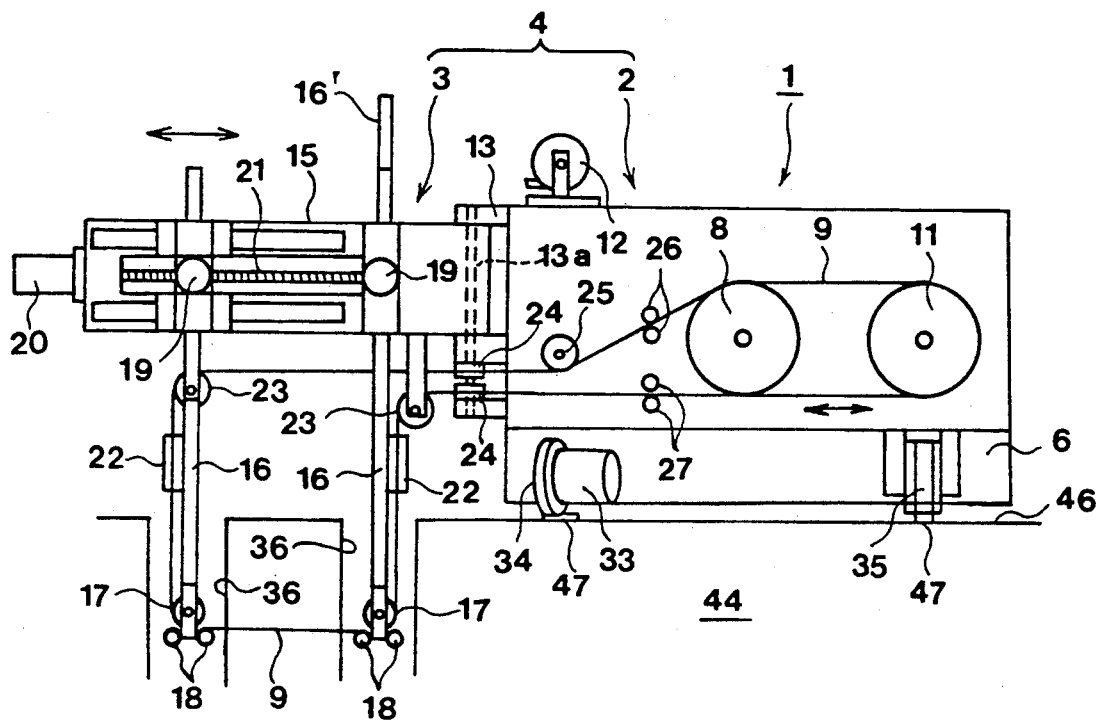
FIG. 1 is a side view of an apparatus of demolishing a biological shield wall of a nuclear reactor.
Figure 2:
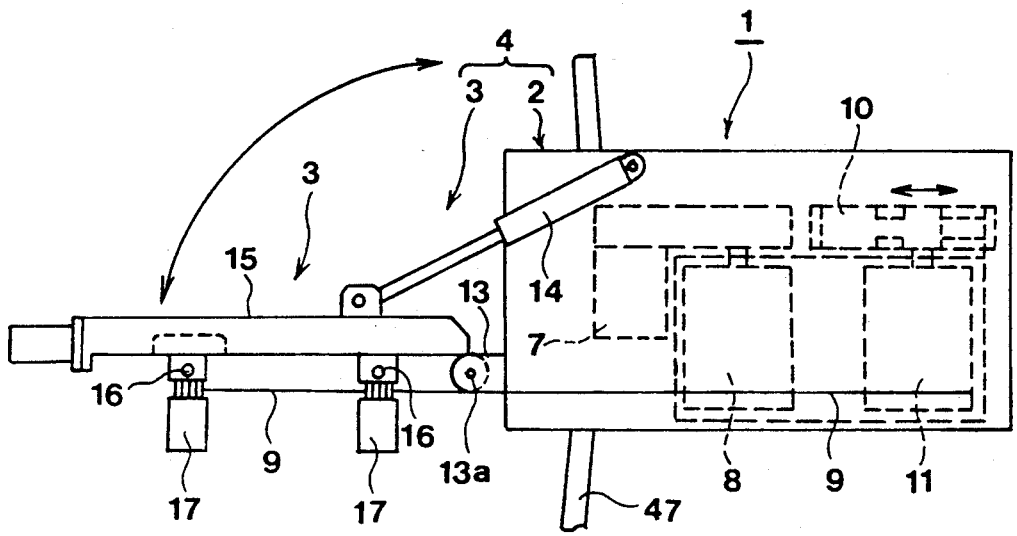
FIG. 2 is a plan view of the apparatus.
Figure 3:
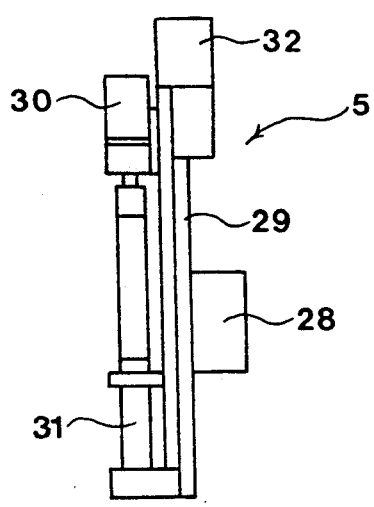
FIG. 3 is a side view of a core boring machine of the apparatus.
Figure 4:
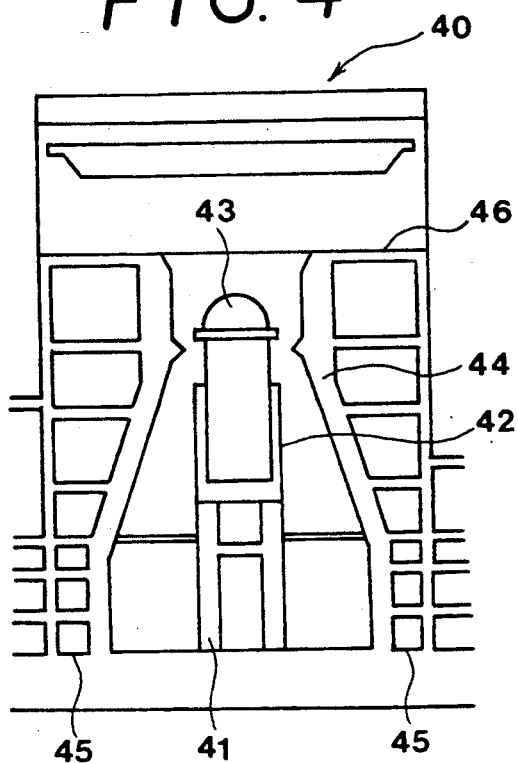
FIG. 4 is a schematic general sectional view of a reactor building housing a boiling-water type reactor.

FIG. 1 is a side view of an apparatus of demolishing a biological shield wall of a nuclear reactor;

FIG. 2 is a plan view of the apparatus; FIG. 3 is a side view of a core boring machine of the apparatus;

FIG. 4 is a schematic general sectional view of a reactor building housing a boiling-water type reactor.

Firstly, in FIG. 4, reference number 40 shows a reactor building and on the reactor base 41 in the center of the building 40, a nuclear reactor 43 of a boiling-water type encircled by a thermal shield 42 is mounted and the outer side of the reactor is encircled by a bell-shaped biological shield concrete wall 44 and the top floor of the multi-storied reactor building 45 outside of the shield wall 44 is formed as an operating floor 46 for the reactor 43.

Next, in FIGS. 1 to 3, 1 indicates an apparatus for demolishing according to the present invention and the demolishing apparatus 1 comprises a concrete cutter device 4 consisted of a driving part 2 for a wire saw and a concrete cutting part 3 attached on the side of the driving part 2, a core boring machine 5 and a carrier truck 6 carrying the wire saw driving part 2 of the concrete cutter device 4.

The driving part 2 for a wire saw 9 includes a driving drum 8 of the wire saw driven by a motor 7, a length and tension controlling drum 11 to change the distance from the driving drum 8 by the length and tension controlling device 10 for the wire saw 9 and a hose reel 12 for the cooling water for cooling the wire saw overheated at the time of cutting concrete.

The wire saw 9 is an endless concrete cutting saw of a conventional type made of a wire rope inserted through a flexible tube of a diameter of 10 mm embedded with a diamond grinding tips.

The concrete cutting part 3 is attached to an engaging receiver 13 on the side of the wire saw driving part 2 by means of a detachable shaft 13a, and includes a table 15 connected to the driving part 2 by a hydraulic cylinder 14 to swing horizontally by 90 degrees. The table carries a pair of vertical rods 16, 16 and the rods 16 in turn provides a supporting pulley 17 on the lower end and a pair of guide rollers 18, 18 to prevent the supporting pulley 17 from touching to the inside of the hole at the time of insertion into the bored hole described later, and from disengaging therefrom in the case of slacking of the wire saw 9. The rods 16 are controlled their heights by engaging of a pinion (not shown) driven by a motor 19 installed on the table 15 and rack (not shown) provided on the vertical rods 16, and one of the rods 16 is arranged so that it can be adjusted its distance from the other rod 16 by engagement of a screw shaft 21 driven by an adjusting motor 20 and screw sleeve (not shown). The vertical rods can be extended by screws threaded on the top of the rod of constant length. In the drawings, 22 is a brush to remove concrete dust deposited on the wire saw 9, and 23, 24, 25, 26 and 27 are intermediate guide rollers for the wire saw 9.

As shown in FIG. 3, the core boring machine 5 includes a vertical base 29 with an engaging part 28 to be engaged with the engaging receiver 13 of the wire saw driving part 2, and on the base 29, a core bit 31 connected to a drilling motor 30 is provided slidably by an actuator 32.

The carrying truck 6 supports the wire saw driving part 2 and is provided with a driving wheel 34 driven by a motor 33 and a driven wheel 35, and runs on the rail 47 laid on the operating floor 46 of the reactor building 40 as shown in FIG. 4.

OPERATION

FIGS. 5 through 9 illustrate steps in series of a method of demolishing a biological shield wall of a nuclear reactor. Firstly, the carrying truck 6 is equipped on the operating floor 46 of the reactor building 40 and the wire saw driving part 2 of the concrete cutter device 4 is mounted and then, the core boring machine 5 is installed on the engaging receiver 13, by engaging the engaging part 28 therewith.

Figure 5:
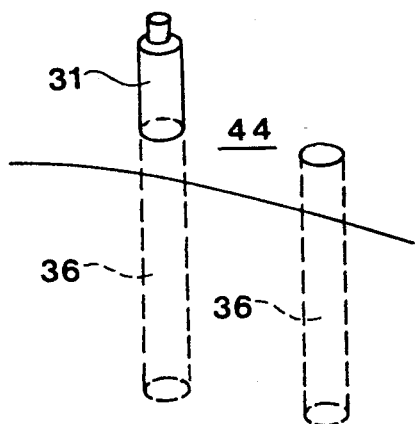
FIG. 5 through FIG. 9 illustrates a method of demolishing a biological shield wall of a nuclear reactor in series of a perspective views according to the present invention using the apparatus.

Then, with the truck 6 moving on, boring holes 36 are bored by the core boring machine 5 from top of and along the shield wall 44 in a predetermined distance to remove a core concrete (FIG. 5).

After the boring operation of holes 36 on the wall 44, the core boring machine 5 is disengaged from the engaging receiver 13 of the wire saw driving part 2, and in the place, the concrete cutting part 3 is changed. Then, the wire saw 9 is drawn out of the wire saw driving part 2, and wound around the wire saw supporting pulley 17, 17 on the end of the vertical rods 16, 16 of the concrete cutting part 3.

Figure 6:
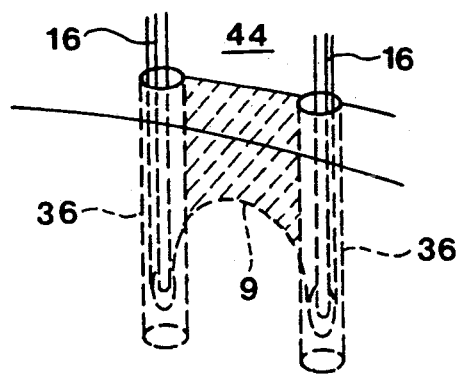

Next, with the distance adjusting motor 20 for the rods driven and controlled, the vertical rods 16, 16 are adjusted to the neighboring two bored holes 36, 36 and with the wire saw 9 driven by the driving drum 8, the vertical rods 16, 16 are inserted into the bored holes 36, 36 driven by the motor 19. Then, by the running of the wire saw 9 between and around the supporting pulley 17, 17 on the end of the vertical rods 16, 16 in the neighboring holes 36, 36, the concrete wall 44 between the holes are cut along the longitudinal direction of the wall (FIG. 6). Here, as the guide roller 18 on the end of the rod 16 touches to the inside wall of the hole, troubles of the loss of driving power of the wire saw due to touching of the supporting pulley 17 to the inside wall of the hole are prevented or the slacking of the wire saw 9 due to the disengagement of the wire saw from the supporting pulley 17 are eliminated.

Figure 7:
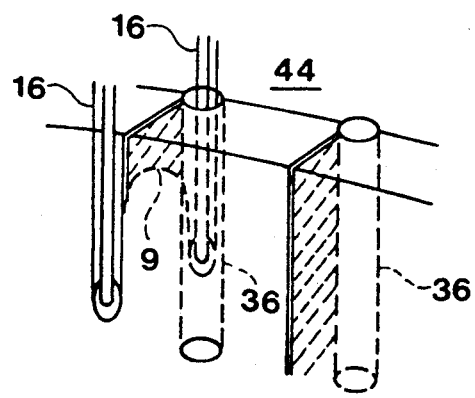

After the above-mentioned concrete cutting, with the rods 16, 16 raised from the holes, and by the operation of the hydraulic cylinder 14, the table 15 is rotated by 90 degrees to the radial direction of the wall 44 and as shown in FIG. 7 cutting of the concrete between the outer or inner surface of the wall and previously bored holes 36 are carried out inwardly or outwardly from each of the holes 36.

Figure 8:
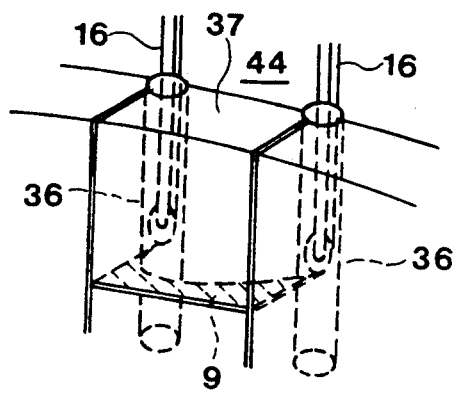

After the radial concrete cutting, with the rods 16, 16 raised again from the holes, and by the operation of the hydraulic cylinder 14, the table 15 is rotated back by 90 degrees to the original circumferential direction of the wall 44 again, and with the vertical rods 16, 16 inserted again and held in the bored hole 36, 36 as shown in FIG. 8, the wire saw 9 is adapted between the lower ends of fixed rods, from one hole and around through the slit cut by the preceding operation in the radial direction and along the inner (or outer) surface of the wall 44 to the other hole.

Then, by the wire saw 9 in tension running between the ends of fixed rods 16, the concrete wall 44 is cut horizontally.

Figure 9:
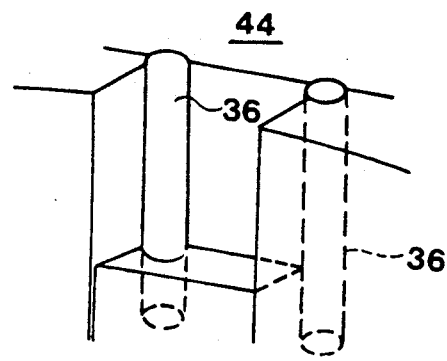

By the cutting process, the concrete wall 44 is cut in four surfaces in all into a shape of a block 37 and can be taken out (FIG. 9). During this process, in order to prevent the wire saw 9 from being caught under the block 37, the block must be temporarily supported, for instance, by means of wedges.

Figure 10:
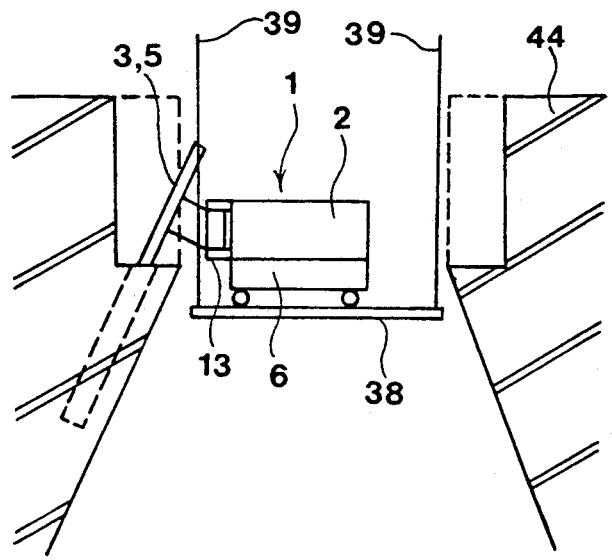
FIG. 10 is a cross-sectional view illustrating the method of demolishing the tapered part of the biological shield wall.

FIG. 10 illustrates the demolishing method of bell-shaped tilted part of a biological shield wall 44. At the part with a tilted wall, the carrier truck 6 carrying the driving part 2 for the wire saw 9 must be fixed on a operating floor 38 hung by hanging wires 39. Then, with the core boring machine 5 or the concrete cutting part 3 engaged interchangeably on the engaging receiver 13 of the wire saw driving part 2 in a tilted direction of the wall 44, and in a same way as described above, boring and cutting of the wall concrete 44 and removing of the block 37 are carried out.

The above-mentioned steps are repeated in the whole circumference and downward of the wall 44.

As, on the inner surface of the biological shield wall 44, a lining plate of stainless steel and the like are provided, to eliminate sooner consumption of the wire saw at the time of concrete cutting by the wire saw, the lining is treated separately beforehand along the cutting line by gouging along the cutting line.

In the method described above, the concrete wall 44 are demolished by cutting into a block one by one cut on four planes and disposed, but alternatively, each cutting process in one direction shown in FIG. 6, 7 and 8 can be carried out continuously on the whole circumference of the wall respectively, and by the alternative method, the table 15 requires less changing of direction of setting and it works more efficiently.

The delivery and drawing of the wire saw 9 and the adjustment of the tension thereof are controlled by the adjusting device 10 working on the length and the tension of the wire saw by extending and shortening of the distance between the driving drum 8 and the controlling drum 11 for the wire saw.

The wire saw 9 is cooled by the cooling water sprayed from a hose drawn out of the reel hose 12 on the working cutting part.

INDUSTRIAL APPLICABILITY

The present invention presents a novel apparatus and a method of demolishing a biological shield wall wherein a carrier truck carrying a wire saw driving part attaching a wire saw cutting part is disposed on a operating floor of a reactor building, and by using both of a core boring machine and a wire saw cutting part, the biological shield wall is demolished, then, compared with the conventional mechanical cutting demolishing method or the fluid cutting dynamics, using a cutting device with tripode supporting legs fixed on the inside of the biological shield wall, with along the progressing of the cutting operation, easy movement and also improvement of the efficiency of the operation can be accomplished, without requiring a large scale for the apparatus even when the biological shield wall gets larger, and accordingly never resulting in the increasing of mass of active wastes, and moreover the invention renders advantages of useful effect such as eliminating arrangements against splash of large amount of contaminated water such as the case in the fluid cutting dynamics.

We claim:

1. A method of demolishing a biological shield wall of a nuclear reactor using a demolishing apparatus comprising a concrete cutter device, consisting of a driving part for a wire saw and a concrete cutting part attached to an engaging receiver of the driving part, a core boring machine and a carrier truck to carry the wire saw driving part of said cutter device, said method comprising the steps of:

setting a carrier truck on a operating floor of a reactor building, with a core boring machine attached on the engaging receiver of the driving part;

boring holes downwardly from atop the shield wall a predetermined distance;

substituting the concrete cutting part for the boring machine on the engaging receiver;

inserting a pair of vertical rods in corresponding bored holes and circulating the wire saw between the lower ends of the vertical rods, the vertical rods being controlled and adjusted to the distance between bored holes to enable the cutting action of the wire saw to cut a concrete block from the shield wall;

cutting a concrete block from the shield wall with the wire saw; and removing the cut concrete block from the shield wall.

2. An apparatus for demolishing a biological shield wall of a nuclear reactor, including a movable support body and a wire saw mechanism mountable on said movable support body, said wire saw mechanism comprising:

a pair of vertical rods;

means for moving said vertical rods vertically down and up, into and out of spaced downwardly directed holes in said wall;

means for adjusting the spacing between said vertical rods; and a wire saw member strung between the lower ends of said pair of vertical rods and along at least a portion of the length of each said rod.

3. The apparatus as claimed in claim 2, comprising:

a pulley adjacent the lower end of each of said vertical rods around which said wire saw member is strung; and guide rollers at the lower ends of said vertical rods positioned to engage the inner surfaces of the holes bored in the biological shield wall, thereby preventing said pulleys and said wire saw member from contacting and binding against such inner surfaces, and for maintaining said wire saw member on said pulley in case of stack in said wire saw member.

4. The apparatus as claimed in claim 2, wherein said movable support body comprises a receiver member, and said wire saw mechanism comprises an attachment means for releasable connection with said receiver member, thereby permitting said wire saw mechanism to be selectively mounted on said support body.

5. The apparatus as claimed in claim 4, including a concrete core boring machine for boring downwardly directed holes in the biological shield wall, said core boring machine comprising an attachment means for releasable connection with said receiver member on said body, thereby permitting said core boring machine to be selectively mounted on said support body.

6. The apparatus as claimed in claim 2, wherein said support body comprises a driving mechanism for operating said wire saw mechanism.

7. The apparatus as claimed in claim 2, wherein said support body comprises a carrier truck with wheels.

8. The apparatus as claimed in claim 2, comprising a table pivotally mounted on said receiver of said body, said wire saw mechanism mounted on said table.

9. The apparatus as claimed in claim 8, wherein said table is pivotable about a vertical axis to permit said wire saw mechanism to swing horizontally and adjustably on said receiver.

10. The apparatus as claimed in claim 9, comprising a hydraulic cylinder coupled between said support body and said table for effecting horizontal swinging and angular adjustment of said table relative to said support body.

11. The method as claimed in claim 1, wherein said cutting step includes:

positioning said pair of vertical rods in corresponding holes bored in the shield wall, the holes being aligned circumferentially along the top of the shield wall;

sawing vertically downward between the holes to form a first cut;

raising the vertical rods to above the upper surface of the shield wall, and rotating the pair of vertical rods until one vertical rod lies above a first one of said holes and the other vertical rod is aligned horizontally spaced from the shield wall, and sawing vertically downward between the first hole and the periphery of the shield wall to form a second cut;

raising the vertical rods to above the upper surface of the shield wall, and moving the pair of vertical rods until one vertical rod lies above a second one of said holes and the other vertical rod is aligned horizontally spaced from the shield wall, and sawing vertically downward between the second hole and the periphery of the shield wall to form a third cut;

raising the vertical rods to above the upper surface of the shield wall, and rotating the pair of vertical rods until said rods are aligned with the first and second holes, stringing the wire saw in the first and second cuts and adjacent the periphery of the shield wall while lowering said vertical rods into the first and second holes; and sawing horizontally inward between the holes to form a fourth cut meeting with said first cut, thereby freeing the concrete block for removal.

* * * * *